United States Patent [19]

Terunuma et al.

[11] 4,245,293
[45] Jan. 13, 1981

[54] POWER CONVERTER SYSTEM

[75] Inventors: Mutsuhiro Terunuma, Mito; Seiya Shima; Kunio Saito, both of Katsuta, all of Japan

[73] Assignee: Hitachi, Ltd., Japan

[21] Appl. No.: 949,120

[22] Filed: Oct. 6, 1978

[30] Foreign Application Priority Data

Oct. 8, 1977 [JP] Japan .................................. 52-121257

[51] Int. Cl.³ ........................................... H02P 13/26
[52] U.S. Cl. ....................................... 363/87; 363/44; 363/79; 363/128
[58] Field of Search .................................. 363/45–46, 363/84–88, 90–93, 128–130, 44, 75–79

[56] References Cited

U.S. PATENT DOCUMENTS

| 3,641,356 | 2/1972 | Ekstrom ............................ 363/35 X |
| 3,971,975 | 7/1976 | Genuit ..................................... 363/91 |
| 4,020,411 | 4/1977 | Tsuboi et al. ............................. 363/68 |

FOREIGN PATENT DOCUMENTS 51-36147  6/1976  Japan .

Primary Examiner—William M. Shoop
Assistant Examiner—Peter S. Wong
Attorney, Agent, or Firm—Craig & Antonelli

[57] ABSTRACT

In a power converter system wherein each thyristor of a three-phase full-wave bridge circuit having thyristors connected in all of bridge arms is fired for its controlling to thereby control the dc output voltage, when the dc output voltage is low, the firing angle of a group of thyristors on the negative side is fixed to a large value and the firing angle of a group of thyristors on the positive side is rendered variable within a small range so that a period may occur through which two thyristors connected in series in the full-wave bridge circuit are fired simultaneously. When the dc output voltage is high, the firing angles of groups of thyristors on both the positive and negative sides are made equal to each other and varied simultaneously. The system improves power factor and form factor over the entire controlling range of the dc output voltage.

8 Claims, 36 Drawing Figures

F I G. 1
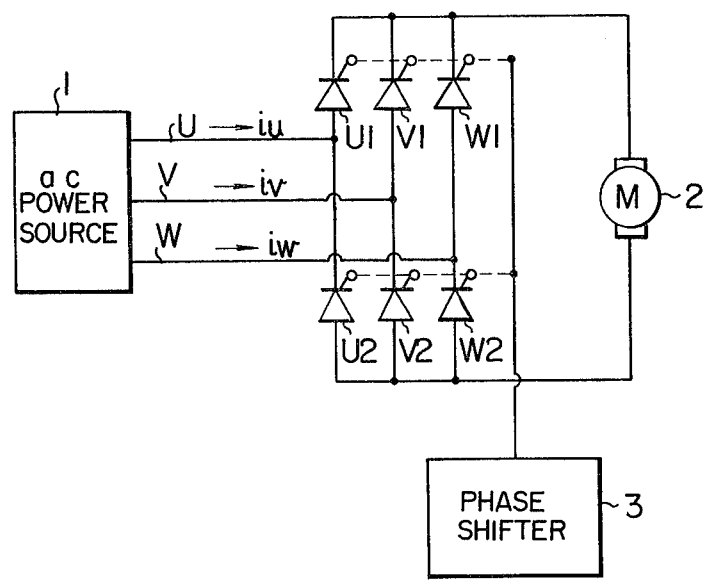
F I G. 4
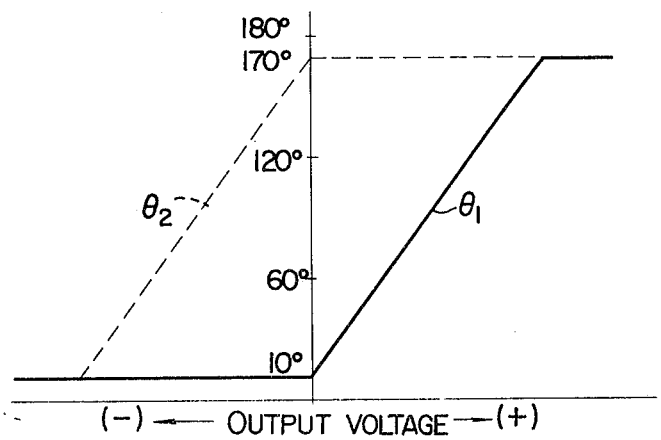

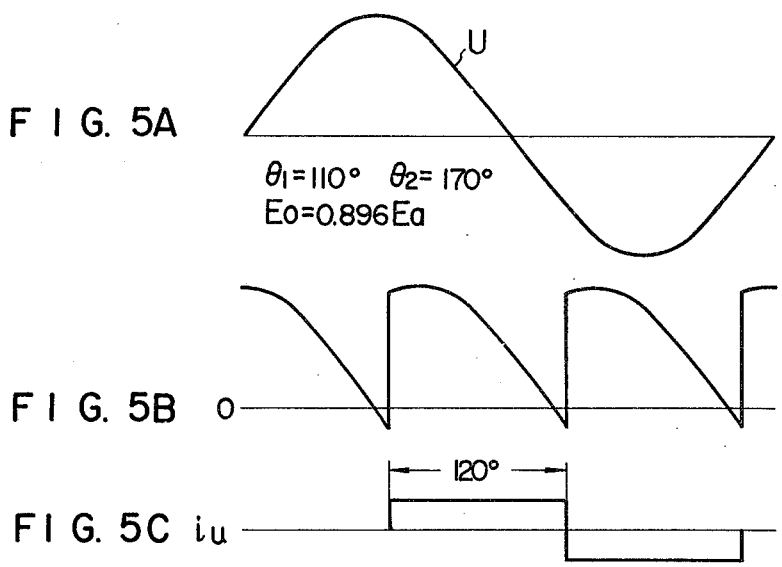
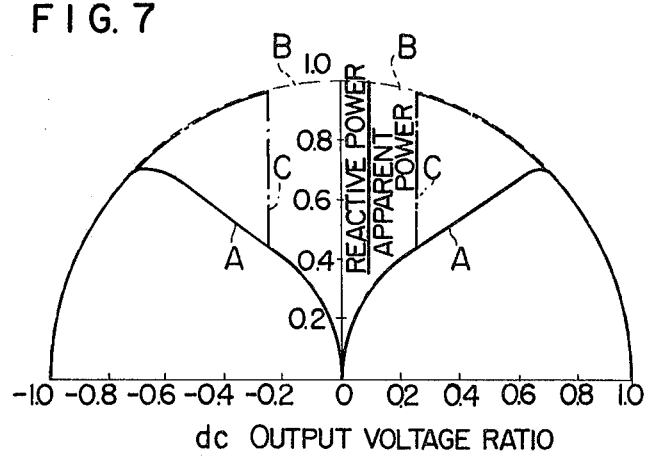

FIG. 6A
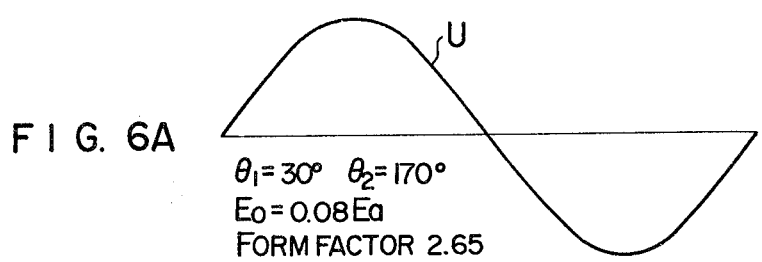
$\theta_1 = 30°$ $\theta_2 = 170°$
$E_0 = 0.08 E_a$
FORM FACTOR 2.65
FIG. 6B
FIG. 6C
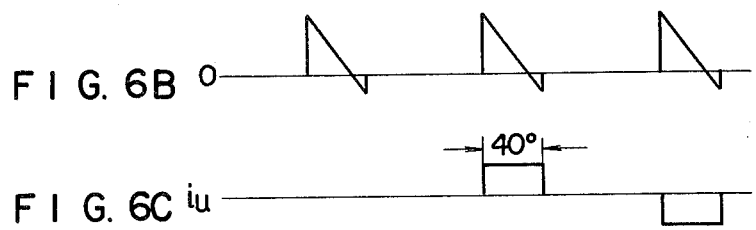
$\theta_1 = 60°$ $\theta_2 = 170°$
$E_0 = 0.327 E_a$ FORM FACTOR 1.66
FIG. 6D
FIG. 6E
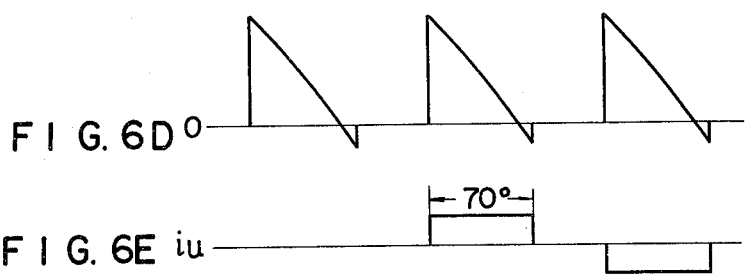

FIG. 12
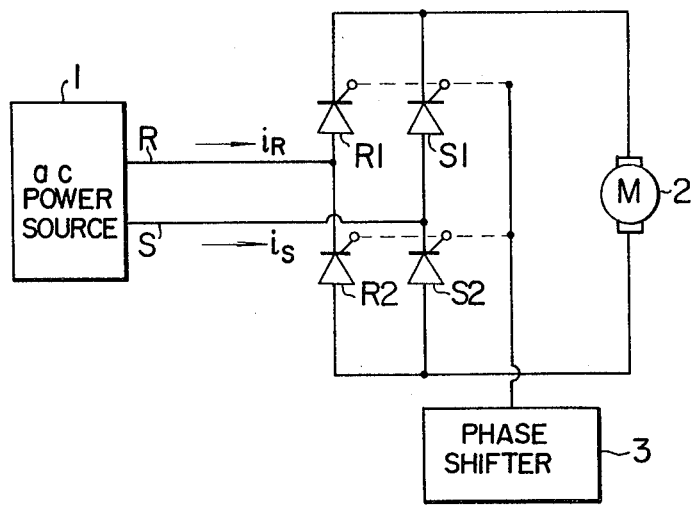
FIG. 13A
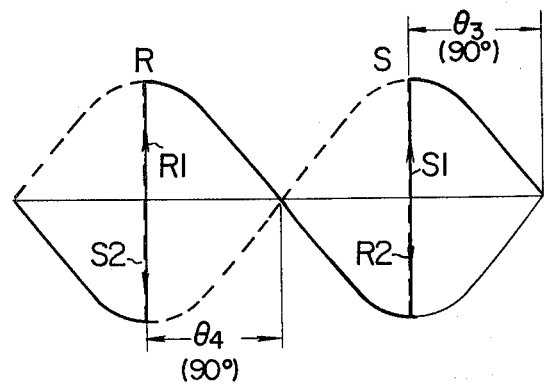
FIG. 13B
| S1 | R1 | S1 |
|----|----|----|
| R2 | S2 | R2 |
FIG. 13C
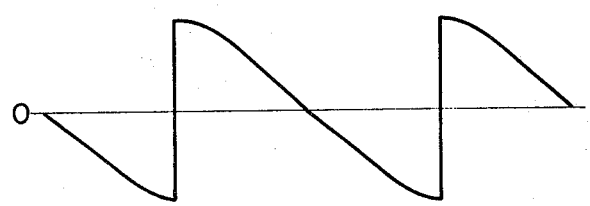
FIG. 13D
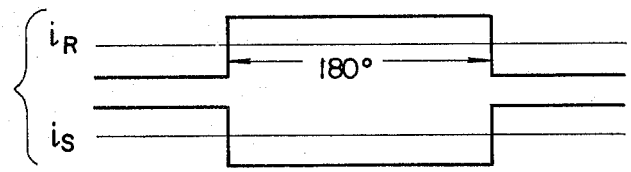

POWER CONVERTER SYSTEM

BACKGROUND OF THE INVENTION

This invention generally relates to power converter systems and more particularly to a power converter system incorporating a full-wave bridge circuit comprised of thyristors connected in all of bridge arms.

In order to feed electric power from an arc power source to a dc load, a power converter system is generally used incorporating a full-wave bridge circuit. Since the dc output voltage delivered from the power converter system is varied by controlling the firing angles of thyristors comprised of the full-wave bridge circuit, the phase of ac current lags with respect to ac voltage, giving rise to the generation of reactive power and the degradation of power factor.

In a most popular method of controlling the firing of thyristors, the firing angles of groups of thyristors comprised of a full-wave bridge circuit on both the positive and negative sides thereof are made equal to each other and the thyristors are fired sequentially and the dc output voltage is controlled by varying these firing angles. With this method, however, as the dc output voltage becomes low, the phase of ac current lags with respect to ac voltage correspondingly, resulting in increase in reactive power and decrease in power factor. These defects are of course causes for increased power consumption and additionally for an increased capacity of the full-wave bridge circuit which in turn adversely affects the power source.

Apart from the aforementioned method for firing controlling, the firing controlling method is known wherein the firing angles of the groups of thyristors on both the positive and negative sides are made different from each other so that a period may occur through which thyristors on both the positive and negative sides, connected in series, are fired simultaneously. With this method, however, when the dc output voltage is high, the form factor is degraded and additionally, the ac power source generates higher harmonics. Accordingly, if the resulting dc power is supplied to a dc motor, for example, the dc motor will pulsate and generate acoustic noises. The higher harmonics, especially, second harmonics associated with the power source raises a problem of inductive interference as well as yields a cause for erroneous operation of relays possibly connected on the power source side. This firing controlling method, therefore, cannot be applicable to a power converter system having a large capacity.

As described above, many problems were involved in the conventional power converter systems and the advent of an excellent power converter system to solve these problems has been desired.

SUMMARY OF THE INVENTION

An object of the present invention is to provide a power converter system incorporating a full-wave bridge circuit which can improve power factor and form factor over the entire controlling range of the dc output voltage and suppress the generation of higher harmonics.

According to the invention, a power converter system incorporating a full-wave bridge circuit having thyristors connected in all of bridge arms is featured by one mode adapted for a range of small absolute value dc output voltages in which dc output terminals of the full-wave bridge circuit are short-circuited through two thyristors connected in series in the full-wave bridge circuit and the other mode adapted for a range of large absolute value dc output voltages in which the above short-circuiting is not carried out.

BRIEF DESCRIPTION OF THE DRAWINGS

In the accompanying drawings:

FIG. 1 is a schematic diagram of a basic circuit of a power converter system with a three-phase ac power source to which the invention is applied;

FIG. 4 is a graphical representation showing relation between the firing angle of thyristor and dc output voltage in the firing controlling method related to FIGS. 3A to 3D;

FIGS. 5A to 5C are wave-form diagrams for explaining the operation in the firing controlling method related to FIGS. 3A to 3D;

FIGS. 6A to 6E are wave-form diagrams for explaining the operation of one embodiment of the invention;

FIG. 7 is a graphical representation showing relation between dc output voltage and power factor;

FIG. 12 is a schematic diagram of a basic circuit of a power converter system with a single phase ac power source to which the invention is applied;

FIGS. 13A to 13D are wave-form diagrams for explaining the non-short-circuiting mode operation in the firing controlling method with the circuit shown in FIG. 12;

DESCRIPTION OF THE PREFERRED EMBODIMENTS

The present invention is applicable to a power converter system with a single phase ac power source as well as to one with a polyphase such as three-phase ac power source. In the following description, a power converter system with three-phase power source incorporating the invention will first be described. A basic circuit arrangement of the power converter system as diagrammatically shown in FIG. 1 comprises a full-wave bridge circuit having thyristors $U_1$, $V_1$ and $W_1$ on the positive side and thyristors $U_2$, $V_2$ and $W_2$ on the negative side, the thyristors on both the sides being fed with electric power from an ac power source 1 through phase lines U, V and W, a phase shifter 3 adapted to phase-control thyristors to produce a dc output voltage, and a motor 2 driven by the dc output voltage.

Figure 2A:
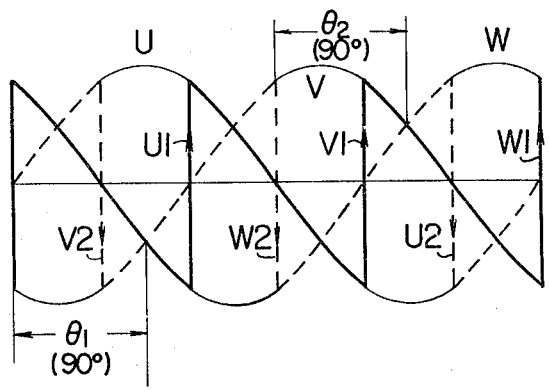
FIGS. 2A to 2D are wave-form diagrams for explaining the non-short-circuiting mode operation in the firing controlling method with the circuit shown in FIG. 1.
Figure 2B:
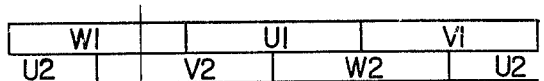
Figure 2C:
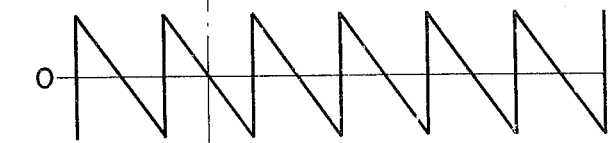
Figure 2D:
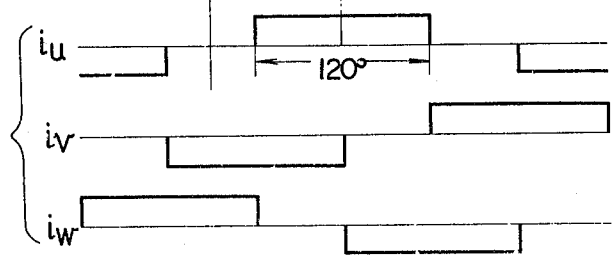

Letting a firing angle (hereinafter indicative of a controlling angle lead) of the positive side thyristors $U_1$, $V_2$ and $W_1$ and of negative side thyristors $U_2$, $V_2$ and $W_2$ be $\theta_1$ and $\theta_2$, respectively, and assuming that $\theta_1 = \theta_2$, a firing controlling method will be described with reference to wave forms shown in FIGS. 2A to 2D. FIG. 2A shows relation between each phase voltage and the firing angle of thyristor, FIG. 2B the conduction period of thyristors being fired, FIG. 2C a wave form of the dc output voltage, and FIG. 2D ac currents $i_u$, $i_v$ and $i_w$ flowing through phases U, V and W. To make zero the average value of dc output voltage, for example, it is determined that $\theta_1 = \theta_2 = 90°$ to obtain a specified relation between phase voltages and thyristors being fired as shown in FIG. 2A, and the phase voltages associated with the thyristors being fired are subtracted from each other to produce a dc output voltage bearing a wave form as shown in FIG. 2C that is averaged to be zero. In this case, however, prime wave forms of ac current lag 90° with respect to ac voltage, resulting in complete reactive power and consequent zero power factor. Accordingly, this firing controlling method is defective in that as the output voltage decreases, the power factor decreases correspondingly.

Figure 3A:
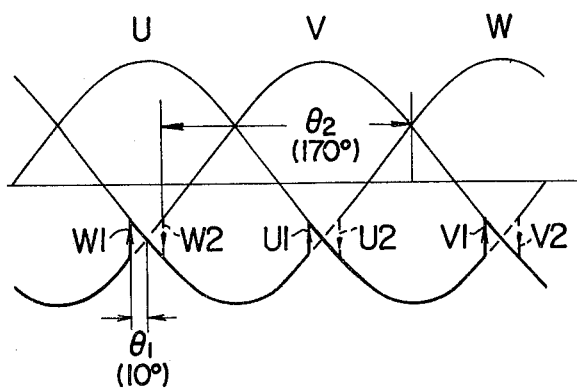
FIGS. 3A to 3D are wave-form diagrams for explaining the short-circuiting mode operation in the firing controlling method with the circuit shown in FIG. 1.
Figure 3B:
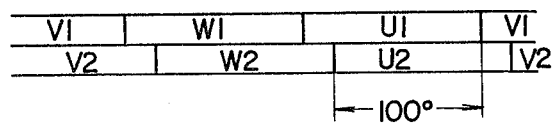
Figure 3C:
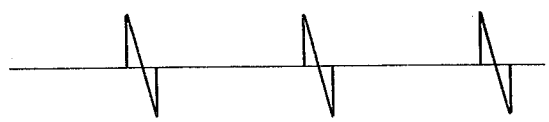
Figure 3D:
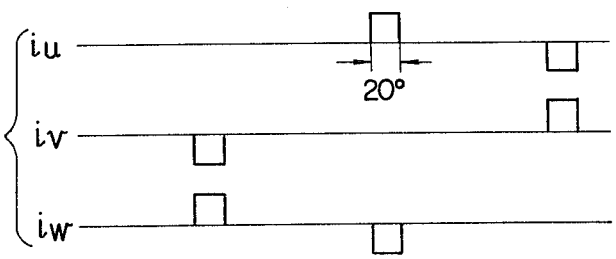

Next, a firing controlling method having a short-circuiting mode will be described with reference to wave forms shown in FIGS. 3A to 3D. As illustrated therein, in order to make zero the dc output voltage, firing angles $\theta_1$ and $\theta_2$ are rendered to approach 0° and 180°, respectively (in FIG. 3A, $\theta_1 = 10°$ and $\theta_2 = 170°$). By this, firings of one thyristor $U_1$ of the series connection of thyristors $U_1$ and $U_2$, one thyristor $V_1$ of the series connection of thyristors $V_1$ and $V_2$ and one thyristor $W_1$ of the series connection of thyristors $W_1$ and $W_2$ in respective phases overlap firings of the other thyristors $U_2$, $V_2$ and $W_2$, respectively, for the same period (100° in these figures) and hence, the dc circuit is short-circuited through the respective series connection thyristors to ensure that commutation period of the respective phase currents is shortened (reduced to 20° in these figures) to thereby decrease the reactive power to a corresponding extent. FIG. 3A shows relation between phase voltages and firing angles, FIG. 3B the conduction period of thyristors being fired, FIG. 3C a wave form of the dc output voltage, and FIG. 3D phase currents $i_u$, $i_v$ and $i_w$.

The magnitude $E_o$ of the dc output voltage can be calculated from the following equation:

$$E_o = \frac{3\sqrt{2}\,E_a}{2\pi} \int_{-\theta_2}^{\pi - \theta_1} (-\sin\theta)\, d\theta \qquad (1)$$

$$= \frac{3\sqrt{2}\,E_a}{2\pi}\{\cos(\pi - \theta_2) - \cos\theta_1\}$$

where $E_a$ represents the amplitude of ac power source voltage. In the controlling the firing angle on the assumption that a minimum value $\theta_1$ min. of $\theta_1$ is 10° and a maximum value $\theta_2$ max. of $\theta_2$ is 170°, when $\theta_1$ is increased starting from 10° while fixing $\theta_2$ to $\theta_2 = 170°$, a positive output voltage is produced and conversely, when $\theta_2$ is decreased from 170° with $\theta_1$ fixed to 10°, a negative output voltage is produced. And, from equation (1), a maximum dc output voltage is 1.33 $E_a$.

As described above, it is possible to decrease the reactive power and consequently improve the power factor by employing the controlling method having the short-circuiting mode. This firing controlling method, however, has disadvantages as described below.

In the first place, the effect of improvement in power factor has no command of dc output voltages having a magnitude exceeding a certain range. More particularly, with reference to FIGS. 5A to 5C showing, particularly in connection with U-phase for simplicity of illustration, a U-phase voltage wave form, a dc output voltage wave form and a U-phase current $i_u$ wave form, respectively, as developing when the positive voltage is generated under the condition that $\theta_1 = 110°$ and $\theta_2 = 170°$, it will be appreciated that as the dc output voltage becomes high, the commutation period of U-phase current increases, reaching 120° when $\theta_1 = 110°$ and $\theta_2 = 170°$ as shown in these figures with the result that this method loses its distinctiveness from the firing controlling method shown in FIGS. 2A to 2D. From equation (1), the dc output voltage has a magnitude of 0.896 $E_a$ which is ⅔ of the maximum dc output voltage of these firing angles. Additionally, at these firing angles, the form factor of the dc output voltage is degraded and when the dc output voltage is loaded with a dc motor, the motor suffers from increased noise.

In the second place, ac circuit suffers from the generation of low order, even harmonics. While the three-phase full-wave thyristor bridge as shown in FIG. 1 is accompanied by 5th, 7th, 11th and 13th order harmonics in the course of three-phase rectification, the controlling method having the short-circuiting mode is accompanied by low order, even harmonics of 2nd, 4th and 8th orders in addition to the above odd harmonics. As the dc output voltage becomes high, the low order harmonics increase correspondingly. Thus, the ac power source circuit is adversely affected and the application of this method is confined to a small capacity power converter system.

The operational principle of FIG. 1 circuit has been described hereinabove. Reference is now made to FIGS. 6A to 11D which illustrate one embodiment incorporating the present invention into the circuit shown in FIG. 1.

In this embodiment, the controlling system has a short-circuiting mode which is valid within a range of low absolute value output voltages, and an effective range of this system will first be determined. The controlling method having the short-circuiting mode was defective, as described above, in that the low order harmonics were generated and the form factor of output voltage was degraded. Of these defects, the generation of the harmonics is not serious if the effective value of current itself is decreased, because the harmonic components decrease much more greatly than the current. Accordingly, a discussion herein will be concentrated on the form factor.

Of wave forms developing when the positive voltage is generated, FIG. 6A shows a wave form of U-phase voltage. FIG. 6B shows a wave form of the dc output voltage having a magnitude $E_o$ of 0.08 $E_a$ under the conditions that $\theta_1 = 30°$ and $\theta_2 = 170°$. FIG. 6C shows a wave form of current $i_u$ in the U-phase under the same condition. FIG. 6D shows a wave form of the dc output voltage having a magnitude $E_o$ of 0.327 $E_a$ under the conditions that $\theta_1 = 60°$ and $\theta_2 = 170°$. FIG. 6E shows a wave form of current $i_u$ in the U-phase under the same condition.

The form factor of dc output voltage is defined as a ratio between effective value $E_e$ and magnitude of output voltage $E_o$. Effective value $E_e$ of dc output voltage is calculated from, $$E_e = \sqrt{2}\, E_a \sqrt{\frac{3}{2\pi} \int_{-\theta_1}^{(\pi - \theta_2)} (-\sin\theta)^2 \, d\theta} \qquad (2)$$

For FIG. 6B, $\theta_1 = 30°$ and $\theta_2 = 170°$ substitute equation (2) and $$E_e = 0.212\, E_a \qquad (3)$$

results, from which a form factor of 2.65 is obtained.

On the other hand, with the controlling system without the short-circuiting mode having a firing angle of 93.45° ($\theta_1 = \theta_2$) when the dc output voltage has a magnitude of 0.08 $E_a$, the output voltage bears an effective value $E_e$ as written by $$E_e = 0.423\, E_a \qquad (4),$$

from which a form factor of 5.3 is obtained.

In this manner, within the low output voltage range, the form factor is improved by the controlling system having the short-circuiting mode.

Next, for FIG. 6D, $\theta_1 = 60°$ and $\theta_2 = 170°$ substitute for equation (2) and, $$E_e = 0.543\, E_a \qquad (5)$$

results, from which a form factor of 1.66 is obtained.

On the other hand, with the controlling system without the short-circuiting mode having a firing angle of 104° ($\theta_1 = \theta_2$) when $E_o = 0.327\, E_a$, $$E_e = 0.505\, E_a \qquad (6)$$

results, from which a form factor of 1.55 is obtained.

It will be appreciated that wave forms developing when the negative voltage is generated are similar to those developing when the positive voltage is generated.

Accordingly, it should be understood that the controlling system having the short-circuit mode operates satisfactorily with $|E_o| = 0.3\, E_a$ at the most in terms of the power factor and the form factor of output voltage, that the power factor is still improved but the form factor is degraded as the magnitude of the output voltage approaches $|E_o| = 0.896\, E_a$, and that the power factor, on the one hand, is equal to that obtainable from the controlling system without short-circuiting mode and the form factor, on the other hand, is degraded when the output voltage exceeds $|E_o| = 0.896\, E_a$.

The form factor of output voltage is related to the generation of noises in the motor and in order to improve both the power factor and the form factor, it is preferable to use the controlling system having the short-circuiting mode within a range $-0.3\, E_a \leq E_o \leq 0.3\, E_a$. Outside the above range, it is preferable to use the controlling system without the short-circuiting mode.

Dependency of the reactive power on the controlling system having the short-circuiting mode and the controlling system without the short-circuiting mode will now be discussed.

FIG. 7 shows ideal, theoretical calculation value of the reactive power, where abscissa represents ratio between the dc output voltage when the controlling is not performed and the dc output voltage when the phase shift controlling is performed, and ordinate represents ratio between the apparent power and the reactive power. In the figure, curve A is representative of the controlling system having the short-circuiting mode, curve B the controlling system without the short-circuiting mode and curve C the controlling system according to one embodiment of the invention. As will be seen from the figure, when the absolute value of the dc output voltage ratio exceeds 0.67, the distinctiveness between the controlling system having the short-circuiting mode and the controlling system without the short-circuiting mode disappears and the same power factor is obtained in the two systems. The controlling system having the short-circuiting mode bears the decreasingly variable reactive power, making a difference between this system and the controlling system without the short-circuiting mode. In particular, within the range of small dc output voltage ratios i.e., small output voltages, rate of the decrease is large, which manifests improved power factor.

Accordingly, in order to improve both the form factor and the power factor, the most excellent expedient is such that the controlling system having the short-circuiting mode is adapted for the range within $|E_o| = 0.3\, E_a$ and the controlling system without the short-circuiting mode is adapted for the range outside $|E_o| = 0.3\, E_a$. This expedient is shown by curve C in FIG. 7.

Figure 8:
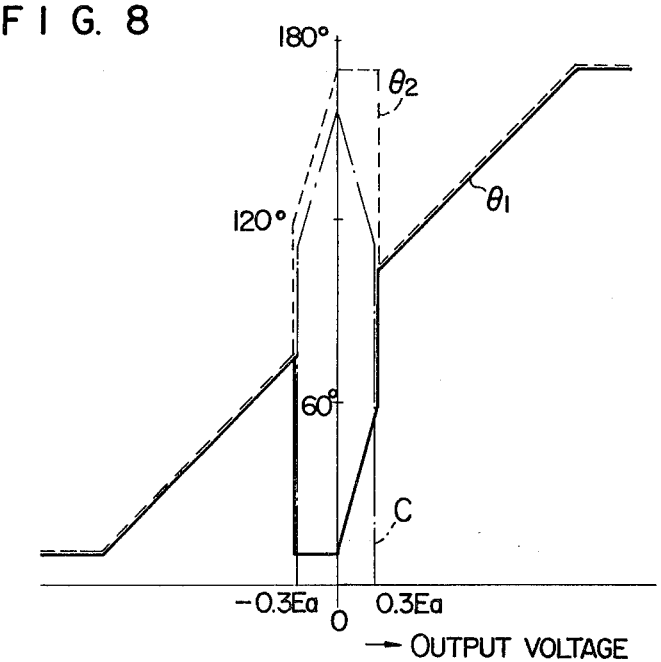
FIG. 8 is a graphical representation showing relation between dc output voltage and firing angle.
Figure 9:
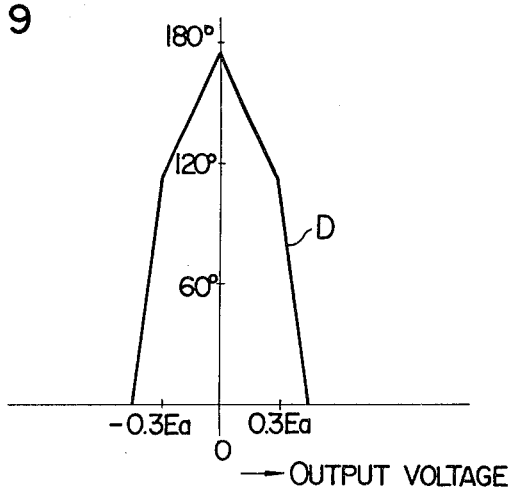
FIG. 9 is a graphical representation showing an example of the amount of bias of a phase shifter for effecting the firing controlling in accordance with the invention.

In relation to curve C, an ideal phase shift characteristic is as shown in FIG. 8. Particularly, the bias is applied such that a desired difference takes place between firing angles $\theta_1$ and $\theta_2$. Ideally, an amount of bias C as shown at chained line in FIG. 8 is desirable but actually, an amount of bias D as shown in FIG. 9 is satisfactory.

Figure 10:
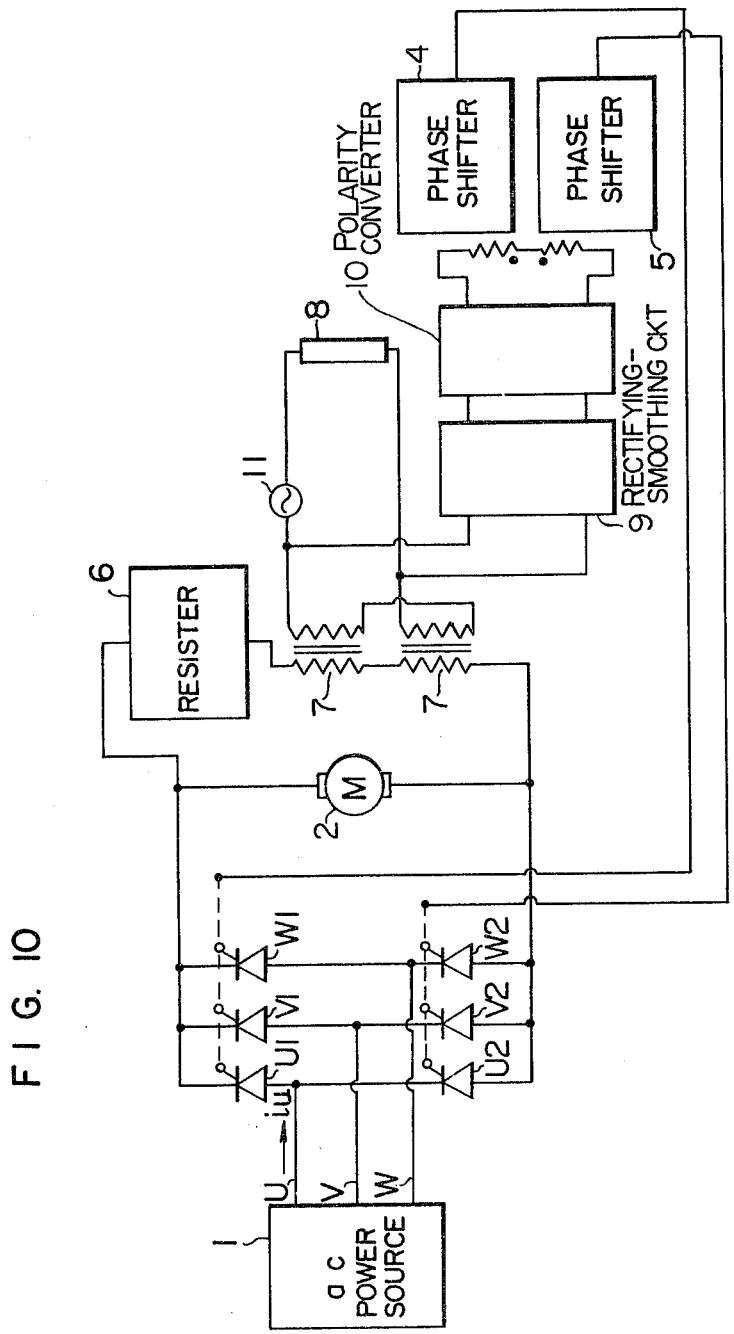
FIG. 10 is a circuit diagram of one embodiment for incorporating the invention into the circuit shown in FIG. 1.

Turning to FIG. 10, one embodiment of a power converter system incorporated with the above expedient according to the invention will be described.

As shown, in a power converter system wherein thyristors $U_1$ to $W_1$ and $U_2$ to $W_2$ supplied with electric power from an ac power source 1 is phase-controlled to produce a dc output voltage which in turn drives a motor 2, a series circuit of a resister 6 and a saturable reactor 7 is connected on the dc output side, an output across output winding of the saturable reactor 7 is rectified and smoothed through a rectifying-smoothing circuit 9, and the polarity of an output of the rectifying-smoothing circuit 9 is converted at a polarity converter 10 to be supplied to a phase shifter 4 for controlling firing angle $\theta_1$ and to a phase shifter 5 for controlling firing angle $\theta_2$, the phase shifters 4 and 5 being reversely biased to each other. 8 is a resistance of the saturable reactor and 11 is an ac power source of the saturable reactor. When the dc output voltage is zero, the output of the saturable reactor is minimized and as the dc output voltage increases (in both positive and negative directions), the output of saturable reactor increases. Accordingly, if the saturable reactor is so designed that its output saturates at approximately $|E_o| = 0.3\, E_a$, it is possible to supply the amount of bias as shown in FIG. 9 to the phase shifters 4 and 5.

In this manner, the embodiment of FIG. 10 ensures that the controlling system having the short-circuiting mode is changed or shifted to the controlling system without short-circuiting mode continuously.

Figure 11A:
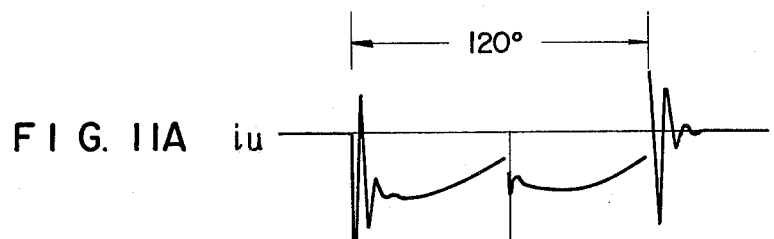
FIGS. 11A to 11D are waveform diagrams showing actually measured wave forms useful to explain effects obtainable from the embodiment of FIG. 10.
Figure 11B:
Figure 11C:
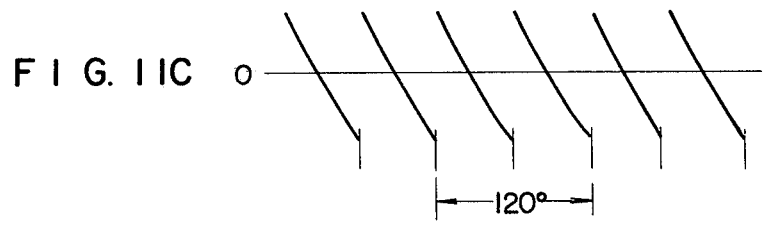
Figure 11D:
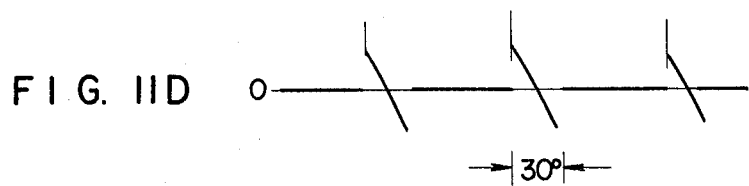
Figure 14A:
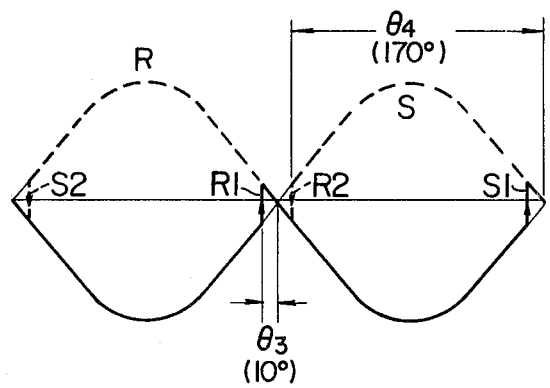
FIGS. 14A to 14D are wave-form diagrams for explaining the short-circuiting mode operation in the firing controlling method with the circuit shown in FIG. 12.
Figure 14B:
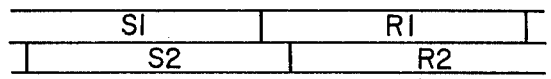
Figure 14C:
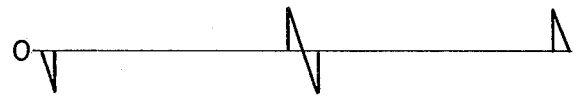
Figure 14D:
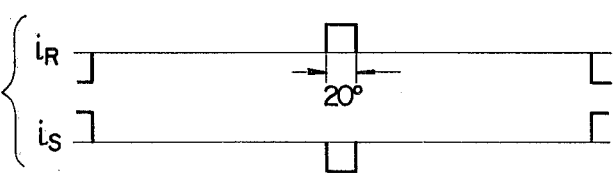

FIGS. 11A to 11D show experimental results telling effects of this embodiment which were experienced under the conditions that $\theta_1 = 10°$ and $\theta_2 = 170°$ as explained with reference to FIGS. 3A to 3D. Specifically, FIG. 11A shows a wave form of U-phase current $i_u$ obtained when the bias is not applied, FIG. 11B a wave form of U-phase current obtained when the bias is applied, FIG. 11C a wave form of output voltage obtained with no bias, and FIG. 11D a wave form of output voltage obtained with the bias. Under the application of the bias, the conduction period exceeds 20° due to irregularity of the phase shifters, as shown in FIG. 11D. From these figures, it will be appreciated that the conduction period of phase current is shortened to decrease the reactive power and the form factor of dc output voltage is improved by applying the bias to the phase shifters.

While having been described as applied to the three-phase full-wave bridge circuit, the invention may obviously be applicable to a single phase full-wave bridge circuit and a polyphase such as six-phase and twelve-phase full-wave bridge circuit.

Now, the application of the invention to a single phase full-wave bridge circuit will be described with reference to FIG. 12 in which the same elements as those in FIG. 1 are designated by the same reference numerals. As shown, an ac power source 1 feeds electric power through phase lines R and S to positive side thyristors R1 and S1 and negative side thyristors R2 and S2, which thyristors are phase-controlled by a phase shifter 3 to drive a motor 2.

FIGS. 13A to 13D show wave forms as related to the firing controlling system of FIG. 12. Specifically, FIG. 13A shows a wave form illustrative of relation between each phase voltage and firing angle of the thyristors, FIG. 13B the conduction period of the thyristors being fired, FIG. 13C a wave form of dc output voltage, and FIG. 13D wave forms of ac currents $i_R$ and $i_S$ in R and S phases. To make zero the dc output voltage, $\theta_3 = \theta_4 = 90°$ is determined so that the phase current commutates through 180° period. Next, $\theta_3 = 10°$ and $\theta_4 = 170°$ are determined to yield the short-circuiting mode wherein the firing angles are associated with the phase voltage and phase current as shown in FIGS. 14A to 14D in which the same parts as those shown in FIGS. 13A to 13D are designated by the same symbols. It will be appreciated from these figures that the conduction period of the phase current is shortened to 20° and consequently the reactive power is decreased.

Figure 15:
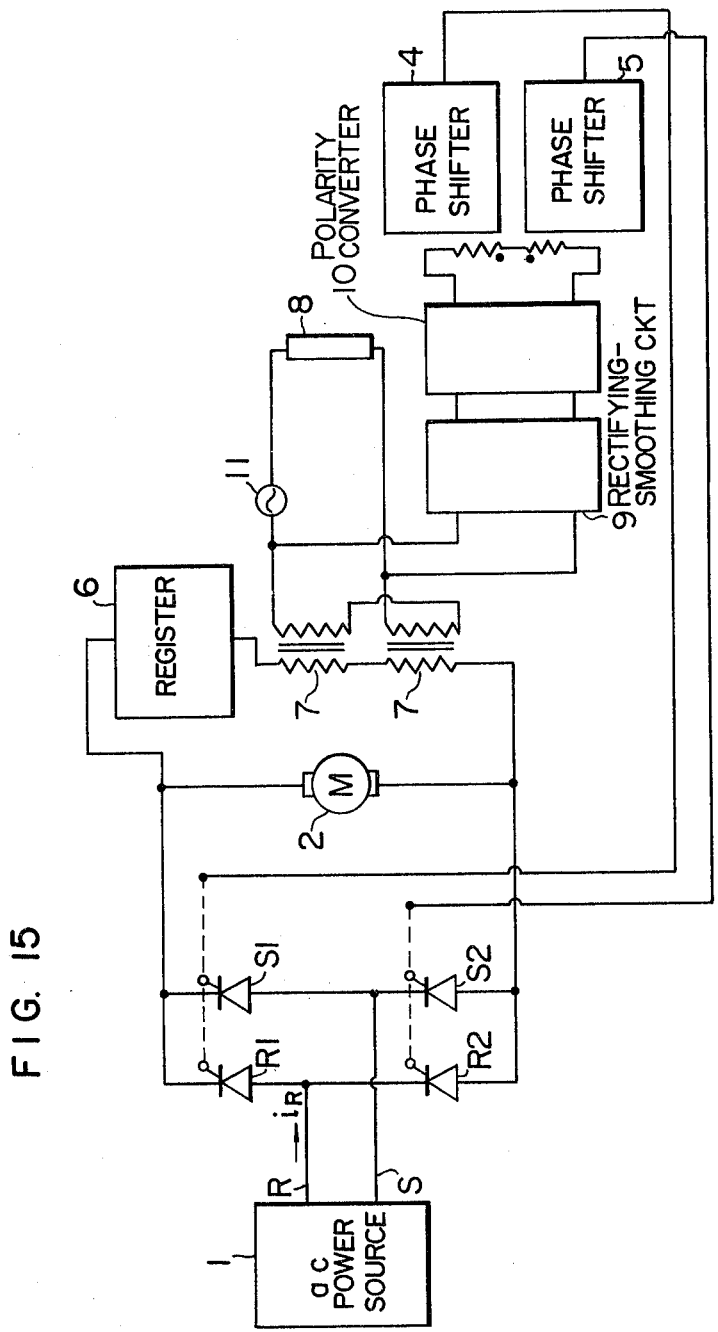
FIG. 15 is a circuit diagram of one embodiment for incorporating the invention into the circuit shown in FIG. 12.

One embodiment of a power converter system incorporating a single phase full-wave bridge according to the invention is shown in FIG. 15 in which the same elements as those in FIG. 10 are designated by the same reference numerals. This embodiment replacing the three-phase full-wave bridge circuit with a single phase full-wave bridge circuit operates in a similar manner to FIG. 10 to ensure that the power factor is improved within a low output voltage range and the form factor is improved.

It was intended by the foregoing embodiments to mainly improve the form factor by carrying out the controlling having the short-circuiting mode within the range $|E_o| \leq 0.3 \ E_a$, but the controlling having the short-circuiting mode within the range $|E_o| \leq 0.896 \ E_a$ may be performed to cover the improvement in the power factor.

As having been described, the invention ensures that the power factor and form factor can be improved remarkably over the entire dc output voltage controlling range in the power converter system. Further, the invention prevents adverse affect of the higher harmonics on the ac power source and hence can be applicable to the large capacity power converter system. Accordingly, the invention is conveniently applicable to a power converter system to be loaded with frequent and repetitive start and stop such as for use in dc elevators, electric locomotives and the like.

What is claimed is:

1. In a power converter system comprising a polyphase full-wave bridge circuit having thyristors connected in all of bridge arms, a polyphase ac power source connected to the ac terminal of the polyphase full-wave bridge circuit, a dc load connected across dc terminals of the polyphase full-wave bridge circuit, and means for controlling the firing of the thyristors, the improvement wherein said thyristor firing controlling means comprises first firing controlling means having a short-circuiting mode in which within a range of small absolute value of the dc output voltage from said polyphase full-wave bridge circuit, the dc terminals of said polyphase full-wave bridge circuit are short-circuited through two thyristors connected in series in said polyphase full-wave bridge circuit, and second firing controlling means not having said short-circuiting mode within a range of large absolute values of said dc output voltage.

2. A power converter system according to claim 1 wherein said first and second firing controlling means each comprise an identical phase shifter and the firing controlling is shifted continuously from the first firing controlling to the second firing controlling.

3. A power converter system according to claim 2 which further comprises means for sensing a value proportional to the absolute value of said dc output voltage and the proportional value is supplied to said phase shifters, whereby the firing controlling may be shifted continuously from the first firing controlling to the second firing controlling in response to said proportional value.

4. A power converter system according to claim 3 wherein said thyristor firing controlling means comprises one phase shifter for controlling the firing of a group of thyristors on the positive side of said polyphase full-wave bridge circuit and the other phase shifter for controlling the firing of a group of thyristors on the negative side, said means for sensing a value proportional to the absolute value of said dc output voltage comprises two saturable reactors for sensing respectively positive and negative voltages proportional to said dc output voltage, means for rectifying and smoothing the output of the saturable reactor, and means for converting the polarity of the smoothed output to produce an output which biases the phase shifters for positive and negative sides in reversed directions to each other.

5. A power converter system according to claim 1 wherein said polyphase full-wave bridge circuit comprises a group of thyristors on the positive side and a group of thyristors on the negative side, and said first firing controlling means is so arranged as to fix the firing angle of the group of thyristors on one side and to vary the firing angle of the group of thyristors on the other side.

6. A power converter system according to claim 1 wherein said polyphase full-wave bridge circuit comprises a group of thyristors on the positive side and a group of thyristors on the negative side, and said second firing controlling means is so arranged as to make equal the firing angles of the groups of thyristors on both the sides and to simultaneously vary the firing angles of the two groups of thyristors.

7. A power converter system according to claim 1 wherein said polyphase ac power source comprises a three-phase ac power source and said polyphase full-wave bridge circuit comprises a three-phase full-wave bridge circuit.

8. A power converter system according to claim 7 said first firing controlling is effected within a range of the absolute value of said dc output voltage at least less than 0.3 times the ac power source voltage.

* * * * *